Patented July 24, 1934

1,967,864

UNITED STATES PATENT OFFICE 1,967,864

HALOGEN-VINYL ACETYLENE AND PROCESS OF PREPARING SAME

Ralph Albert Jacobson, Ardentown, Del., assignor to E. I. du Pont de Nemours & Company, Wilmington, Del., a corporation of Delaware No Drawing. Application February 23, 1933, Serial No. 658,143

12 Claims. (Cl. 260—2)

This invention relates to new chemical compounds and processes for preparing same, and in particular it pertains to the preparation of novel halogen-vinylacetylenes and derivatives thereof.

It is an object of the invention to prepare 1-halogen-2-vinylacetylenes having the general formula: $XC \equiv C-CH=CH_2$, where X is a halogen atom. A further object of the invention relates to the process of preparing the said compounds by reacting monovinylacetylene with an alkaline hypohalite. A further object of invention pertains to the polymerization of the said compounds, and to the preparation of derivatives of the said compounds. It is a further object of the invention to cover the 1-halogen-2-vinylacetylenes, their polymers and derivatives as new chemical compounds. Other objects will appear hereinafter.

In accordance with the present invention, it has been discovered that monovinylacetylene can be converted into halogen derivatives having the formula: $XC \equiv C-CH=CH_2$, in which X is a halogen atom, by reacting monovinylacetylene with an alkaline hypohalite. The reaction, as applied for example to the formation of the bromine derivative, probably takes place as follows:

$$KOBr + HC \equiv C-CH=CH_2 \rightarrow BrC \equiv C-CH=CH_2 + KOH$$

The preferred procedure for the preparation of the 1-halogen-2-vinylacetylenes involves adding monovinylacetylene slowly and with vigorous agitation to an alkaline solution of the hypohalite at 0° C. The reaction is preferably carried out in the presence of an excess of potassium hydroxide though an excess of the hydroxide of any alkali or alkaline earth metal can be used. An atmosphere of nitrogen or some other inert gas is preferably maintained during the reaction. The 1-halogen-2-vinylacetylene is obtained as an oily liquid which in the case of the bromo and iodo derivatves separates to the bottom of the reaction flask while in the case of the chloro compound, it becomes the upper layer. The layer of 1-halogen-2-vinylacetylene is removed, dried with calcium chloride or other drying agent and distilled in an inert atmosphere preferably at reduced pressure.

Various modifications of this procedure can be employed such as the method to be described later under Example II for the preparation of 1-iodo-2-vinylacetylen. Under the conditions there described, the monovinylacetylene is vigorously agitated at 0° C. with potassium hydroxide solution and a solution of iodine and potassium iodide in water added slowly to the mixture. The principle, however, is the same, since reaction occurs only after the hypohalite becomes available in the mixture.

The following examples represent preferred modes of applying the invention, and are to be construed as illustrative only:

Example I—1-bromo-2-vinylacetylene

Bromine (80 g.) was added at 0° C. to 180 g. of potassium hydroxide in 800 g. of water. To this solution, 30 g. of vinylacetylene was added during one-half hour while the mixture was stirred in a stream of nitrogen. Reaction occurred rapidly and when stirring was interrupted after 2 hours a heavy oily layer had separated at the bottom of the flask. This was separated, dried with calcium chloride and distilled in an atmosphere of nitrogen under reduced pressure. Some vinylacetylene was recovered, and then 36.4 g. (55%) of 1-bromo-2-vinylacetylene was collected between 52° and 53° C. at 217 mm. A small amount of liquid remaining in the distilling flask was discarded. The bromovinylacetylene was colorless as it condensed in the receiver but it darkened upon standing. The odor of the compound was sickening and exposure to its vapors caused headaches. A specimen stabilized with hydroquinone did not polymerize within a month but when examined several months later it was a highly explosive black solid. The density and refractive index of 1-bromo-2-vinylacetylene were respectively $$D^{20}_{4} 1.4804$$

and

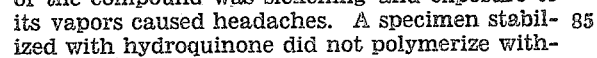

$$N^{20}_{D} 1.5182.$$

Example II—1-iodo-2-vinylacetylene

A solution of 84 g. (1.5 mole) of potassium hydroxide in 1000 g. water was cooled to 0° C. and placed in a flask fitted with a stirrer and condenser. Sixty-five g. vinylacetylene was added and then with vigorous stirring during two hours a solution of 140 g. potassium iodide and 127 g. iodine in 110 cc. water. The mixture was stirred for two hours longer at 0° C. and then at room temperature for two hours, after which it was allowed to stand overnight. The 1-iodo-2-vinylacetylene (95 g.) which had separated to the bottom was removed, dried with calcium chloride, and distilled under reduced pressure in a nitrogen atmosphere. The yield of pure compound was 49 g. (27.5%). The compound was at first colorless, but on standing it became reddish brown in color. After a month at 10° C. it had polymerized to a jelly, and after several months the polymer was a black solid similar in appearance to charcoal. This polymer was extremely explosive. The 1-iodo-2-vinylacetylene boiled at 78° C. at 125 mm. and the density and refractive index were respectively $$D_4^{20} 1.8968$$

and $$N_D^{20} 1.5948.$$

*Example III—1-chloro-2-vinylacetylene*

A solution of 500 g. potassium hydroxide in 1800 cc. water was cooled to 0° C. and chlorine was bubbled in for three hours. The increase in weight was 225 g. To the solution at 0° C. was added 300 g. vinylacetylene and the mixture was stirred vigorously for 8 hours. After standing overnight, the upper layer (47 g.) was separated, dried with calcium chloride, and distilled in a nitrogen atmosphere. After two distillations, the 1-chloro-2-vinylacetylene boiling at 55° to 57° C. at 760 mm. was obtained. The compound possessed a sickening odor and while colorless at first, it darkened on standing and ultimately polymerized to a black, brittle resinous solid. The density and refractive index of 1-chloro-2-vinylacetylene were respectively $$D_4^{20} 1.0032$$

and $$N_D^{20} 1.4663.$$

The temperature of 0° C. given in the above examples is preferred. However, other temperatures may be used provided the reaction mass is kept cold. The temperature may, for example, be varied from about 10° C. to the freezing point of the solution.

The 1-halogen-2-vinylacetylenes are colorless liquids when freshly prepared but soon discolor upon standing. Under diminished pressure in an atmosphere of nitrogen they can be distilled but dangerous explosions are likely to occur if air is present or if heating of the residue is carried too far. The liquids have highly characteristic sickening odors. Upon standing, the 1-halogen-2-vinylacetylenes darken and are finally transformed into black, brittle solids. These solids are sensitive to heat and percussion and they explode with considerable violence. The polymer from the iodo compound is the most sensitive and violent; that from the chloro compound the least. The 1-halogen-2-vinylacetylenes readily add additional halogen to yield oily liquids and they also add hydrogen halides.

*Example IV—Polymerization of 1-iodo-2-vinylacetylene*

A sample of 1-iodo-2-vinylacetylene, which was allowed to stand in an ice chest, polymerized in a few days to a soft jelly. During the course of a month the jelly became very firm and the final product was a hard, brittle, explosive solid. When allowed to polymerize at room temperature, the transformation of 1-iodo-2-vinylacetylene to the polymeric solid took place much more rapidly. The polymerization of 1-bromo-2-vinylacetylene and 1-chloro-2-vinylacetylene proceeded in similar fashion.

Polymerization of the 1-halogen-2-vinylacetylenes can be accelerated by the use of the usual polymerization accelerators, e. g., ultraviolet light, benzoyl peroxide, ozonides, and the like. Polymerization may be inhibited either partially or nearly entirely by the use of oxidation inhibitors such as hydroquinone, pyrogallol, etc.

The 1-halogen-2-vinylacetylenes are structurally of considerable interest since they are highly unsaturated and very reactive. This suggests their use for the synthesis of other derivatives either by addition reactions to the unsaturated carbon atoms or by substitution of the acetylenic halogen. One of these reactions, for example, is the reaction of 1-bromo-2-vinylacetylene with sodium vinyl-acetylide to yield a polymeric solid. The 1-halogen-2-vinylacetylenes readily add bromine, iodine, and chlorine to yield oily liquids, and also add hydrogen chloride to yield oily liquids, which polymerize under the action of light to hard resins. The analytical data show that in the case of 1-bromo-2-vinylacetylenes one molecule of hydrogen chloride adds. The resultant products then polymerize under the action of light to hard resins.

The above description and examples are capable of considerable change within the scope of the invention. Any variation therefrom which conforms to the spirit of the invention is intended to be included within the scope of the claims.

I claim:

1. A chemical compound having the formula:

$$XC \equiv C\text{---}CH = CH_2,$$

in which X is a halogen atom.

2. A polymer of a compound which compound has the formula:

$$XC \equiv C\text{---}CH = CH_2,$$

in which X is a halogen atom.

3. In the process of forming 1-halogen-2-vinyl-acetylenes, the step which comprises treating monovinyl-acetylene with a solution of alkaline hypohalite.

4. In the process of forming 1-halogen-2-vinyl-acetylenes, the step which comprises treating monovinyl-acetylene with a solution of alkali metal hypohalite.

5. In the process of forming 1-halogen-2-vinyl-acetylenes, the step which comprises treating monovinyl-acetylene with a solution of alkaline hypohalite in the cold.

6. In the process of forming 1-halogen-2-vinyl-acetylenes, the step which comprises treating monovinyl-acetylene with a solution of alkali metal hypohalite at a temperature of about 0° C.

7. The compound described in claim 1 in which X is a chlorine atom.

8. The compound described in claim 1 in which X is a bromine atom.

9. The compound described in claim 1 in which X is an iodine atom.

10. The product described in claim 2 in which X is a chlorine atom.

11. The product described in claim 2 in which X is a bromine atom.

12. The product described in claim 2 in which X is an iodine atom.

RALPH ALBERT JACOBSON.